United States Patent
Ikeda et al.

(10) Patent No.: US 7,248,288 B2
(45) Date of Patent: Jul. 24, 2007

(54) SIGNAL PROCESSING APPARATUS AND METHOD FOR REDUCING JAGGEDNESS ON COLOR IMAGE EDGE AND IMAGE SENSING APPARATUS HAVING SAME

(75) Inventors: Eiichiro Ikeda, Kanagawa (JP);
Toshiaki Endo, Kanagawa (JP);
Takaaki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 09/891,017

(22) Filed: Jun. 25, 2001

(65) Prior Publication Data

US 2002/0051088 A1    May 2, 2002

(30) Foreign Application Priority Data

Jun. 26, 2000   (JP)   .............. 2000-191657

(51) Int. Cl.
*H04N 5/228*    (2006.01)
*H04N 9/64*    (2006.01)
*G06K 9/00*    (2006.01)

(52) U.S. Cl. .............. 348/222.1; 348/649; 382/162
(58) Field of Classification Search ............. 348/26, 348/30, 649, 630, 252
See application file for complete search history.

(56) References Cited

U.S. PATENT DOCUMENTS

| | | | | |
|---|---|---|---|---|
| 4,814,859 A | * | 3/1989 | Kimura et al. | 348/30 |
| 5,331,442 A | * | 7/1994 | Sorimachi | 358/532 |
| 5,471,241 A | * | 11/1995 | Hieda | 348/222.1 |
| 5,546,125 A | * | 8/1996 | Tomitaka et al. | 348/30 |
| 5,874,988 A | * | 2/1999 | Gu | 382/167 |
| 5,905,532 A | | 5/1999 | Ito et al. | 348/253 |
| 5,999,230 A | * | 12/1999 | Tanabe | 348/649 |
| 6,377,711 B1 | * | 4/2002 | Morgana | 382/167 |
| 6,603,878 B1 | * | 8/2003 | Takemoto | 382/167 |
| 6,774,943 B1 | * | 8/2004 | Kao et al. | 348/252 |
| 6,958,772 B1 | * | 10/2005 | Sugimori | 348/222.1 |

FOREIGN PATENT DOCUMENTS

| | | |
|---|---|---|
| JP | 63-313989 | 12/1988 |
| JP | 5-076035 | 3/1993 |
| JP | 8-191456 | 7/1996 |
| JP | 8-294020 | 11/1996 |
| JP | 10-049687 | 2/1998 |
| JP | 10-126811 | 5/1998 |
| JP | 11-168740 | 6/1999 |

OTHER PUBLICATIONS

Office Action dated Dec. 19, 2003, concerning Japanese Patent Application No. 2000-191657.

* cited by examiner

*Primary Examiner*—David Ometz
*Assistant Examiner*—Luong T. Nguyen
(74) *Attorney, Agent, or Firm*—Morgan & Finnegan, L.L.P.

(57) ABSTRACT

In a signal processing apparatus for processing an image signal, a hue difference between adjoining pixels is detected by a color image edge detector, and an aperture control main gain circuit amplifies a luminance signal using a gain determined on the basis of the hue difference detected by the color image edge detector to enhance an edge pixel of an image.

12 Claims, 12 Drawing Sheets

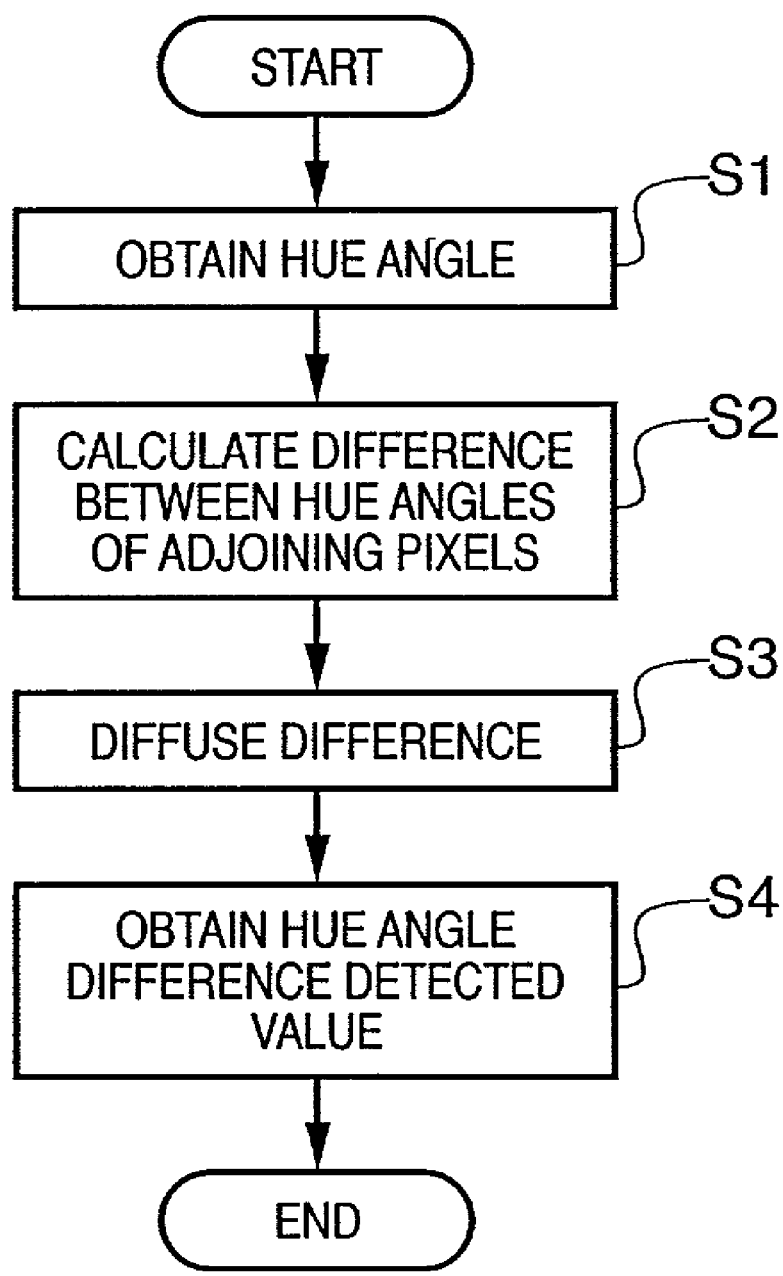

FIG. 3A

| -126 | -126 | -126 | -2389 | -2389 | -2389 |
|------|------|------|-------|-------|-------|
| -126 | -126 | -126 | -2389 | -2389 | -2389 |
| -126 | -126 | -126 | -2389 | -2389 | -2389 |
| -126 | -126 | -126 | -2389 | -2389 | -2389 |

FIG. 3B

| 0 | 0 | 2263 | 0 | 0 | 0 |
|---|---|------|---|---|---|
| 0 | 0 | 2263 | 0 | 0 | 0 |
| 0 | 0 | 2263 | 0 | 0 | 0 |
| 0 | 0 | 2263 | 0 | 0 | 0 |

FIG. 3C

| 0 | 2263 | 2263 | 2263 | 0 | 0 |
|---|------|------|------|---|---|
| 0 | 2263 | 2263 | 2263 | 0 | 0 |
| 0 | 2263 | 2263 | 2263 | 0 | 0 |
| 0 | 2263 | 2263 | 2263 | 0 | 0 |

FIG. 4
(Prior Art)

| | | |
|---|---|---|
| P1(R) | P2(G) | P3(R) |
| P4(G) | P5(B) | P6(G) |
| P7(R) | P8(G) | P9(R) |

FIG. 11
(Prior Art)

| R | G | R | G |
|---|---|---|---|
| G | B | G | B |
| R | G | R | G |
| G | B | G | B |

SIGNAL PROCESSING APPARATUS AND METHOD FOR REDUCING JAGGEDNESS ON COLOR IMAGE EDGE AND IMAGE SENSING APPARATUS HAVING SAME

FIELD OF THE INVENTION

The present invention relates to a signal processing apparatus and method and image sensing apparatus and, more particularly, to a signal processing apparatus and method and image sensing apparatus for reducing jaggedness on color image edges.

BACKGROUND OF THE INVENTION

FIG. 10 is a block diagram showing a configuration of a signal processing unit of a conventional single-CCD digital camera.

A signal from a CCD image sensing element 501 is adjusted in white gain by a white balance (WB) circuit 502, and sent to a luminance notch circuit 510. The luminance notch circuit 510 reduces the gain of color signal components near the Nyquist frequency in the vertical direction by using a vertical low-pass filter (VLPF), and also reduces the gain in the horizontal direction by using a horizontal low-pass filter (HLPF). These filters are called luminance notch filters. Then, a horizontal bandpass filter (HBPF) circuit 511 and vertical bandpass filter (VBPF) circuit 514 shift up frequency components slightly lower than the Nyquist frequency decreased by the notch filters.

Aperture peak (PP) gain circuits 512 and 515 adjust the amplitude in both the horizontal and vertical directions, and base clip (BC) circuits 513 and 516 clip small-amplitude components and remove noise. An adder 517 adds the horizontal and vertical components, an aperture control (APC) main gain circuit 518 applies a main gain to the resultant signal, and an adder 519 adds a baseband signal to the signal. A γ conversion circuit 520 γ-converts the signal, and a luminance correction (YCOMP) circuit 521 corrects the luminance signal level by color.

Further, a color interpolation circuit 503 interpolates a chroma signal so as to give color pixel values to all pixels. A color conversion matrix (MTX) circuit 504 converts the complementary color signals to luminance (Y) signals and color difference (Cr, Cb) signals. Thereafter, a chroma suppress (CSUP) circuit 505 suppresses the color-difference gain in low and high luminance regions, and a chroma low-pass filter (CLPF) circuit 506 limits the band of the chroma signals. A γ conversion circuit 507 converts the band-limited chroma signal into R, G, and B signals and at the same time γ-converts the R, G, and B signals. The γ-converted R, G, and B signals are converted into Y, Cr, and Cb signals again. A chroma gain knee circuit 508 adjusts the chroma gain of the luminance and color difference signals, and a linear clip matrix (LCMTX) circuit 509 finely adjusts the hue as well as corrects shift in hue due to variation in quality of image sensing elements.

Assume that an output from an image sensing element having filters of a checkered Bayer layout as shown in FIG. 4 is processed by the luminance notch circuit 510. In particular, primary color filters achieve good color separation. Therefore, as shown in FIG. 12A, the conventional notch filter method, which is a filtering method using signals from all pixels, cannot absorb gain differences between different color filters by using LPFs at the edge of an image having opposite hues, e.g., red and blue in left and right halves. The edge staircases or becomes jagged, which degrades the image quality of a playback image. This will be explained with reference to FIG. 12B.

FIG. 12B is a view for explaining an output level from each pixel of the image sensing element. In FIG. 12B, a pixel outputting a relatively large value is blank, and a pixel having an output of almost 0 is hatched for descriptive convenience. Signal level differences between different color filters are large at an edge between colors of opposite hues (referred to as "opposite hue edge", hereinafter), and appear jagged. Further, the jaggedness is enhanced by edge enhancement which is performed to increase the resolution (MTF: Modulation Transfer Function) which has been decreased by LPFs.

SUMMARY OF THE INVENTION

The present invention has been made in consideration of the above situation, and has as its object to prevent jaggedness at color image edges from being enhanced by edge enhancement processing and generate a good luminance signal.

It is another object of the present invention to properly reproduce colors without changing a ratio between color components of luminance signals.

According to the present invention, the foregoing object is attained by providing a signal processing apparatus for processing an image signal comprising: a hue difference detector for detecting a hue difference between adjoining pixels; and luminance edge enhancement means for enhancing an edge pixel in an image by amplifying an edge luminance signal by a gain determined on the basis of the hue difference detected by the hue difference detector.

According to the present invention, the foregoing object is also attained by providing a signal processing apparatus for processing an image signal comprising: a hue difference detector for detecting a hue difference between adjoining pixels; a plurality of luminance signal generators for generating a plurality of luminance signals by applying different processing on an input luminance signal; a selector for selecting one of the plurality of luminance signals on the basis of the hue difference detected by the hue difference detector; and a processor for applying a predetermined signal process on the luminance signal selected by the selector.

Further, according to the present invention, the foregoing object is also attained by providing a signal processing apparatus for processing an image signal comprising: a hue difference detector for detecting a hue difference between adjoining pixels; a plurality of luminance signal generators for generating a plurality of luminance signals by applying different processing on an input luminance signal; operation means for operating the plurality of luminance signals using a value obtained on the basis of the hue difference detected by the hue difference detector and outputting an operation result; and a processor for applying a predetermined signal process on the operation result outputted from the operation means.

Furthermore, according to the present invention, the foregoing object is also attained by providing a signal processing method for processing an image signal comprising: a hue difference detection step of detecting a hue difference between adjoining pixels; and a luminance edge enhancement step of enhancing an edge pixel in an image by amplifying an edge luminance signal by a gain determined on the basis of the hue difference detected at the hue difference detection step.

Further, according to the present invention, the foregoing object is also attained by providing a signal processing method for processing an image signal comprising: a hue difference detection step of detecting a hue difference between adjoining pixels; a plurality of luminance signal generation steps of generating a plurality of luminance signals by applying different processing on an input luminance signal; a selection step of selecting one of the plurality of luminance signals on the basis of the hue difference detected in the hue difference detection step; and a processing step of applying a predetermined signal process on the luminance signal selected in the selection step.

Further, according to the present invention, the foregoing object is also attained by providing a signal processing method for processing an image signal comprising: a hue difference detection step of detecting a hue difference between adjoining pixels; a plurality of luminance signal generation steps of generating a plurality of luminance signals by applying different processing on an input luminance signal; an operation step of operating the plurality of luminance signals using a value obtained on the basis of the hue difference detected in the hue difference detection steps and outputting an operation result; and a processing step of applying a predetermined signal process on the operation result outputted in the operation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 2 is a flowchart for explaining an operation of a color image edge detector according to an embodiment of the present invention;

FIG. 3A to 3C are drawings for explaining color image edge detection;

FIG. 4 is a view for explaining generation of a luminance signal using out of green method;

FIG. 11 is a view showing a filter layout.

DETAILED DESCRIPTION OF THE PREFERRED EMBODIMENT

A preferred embodiment of the present invention will be described in detail in accordance with the accompanying drawings.

Figure 1:
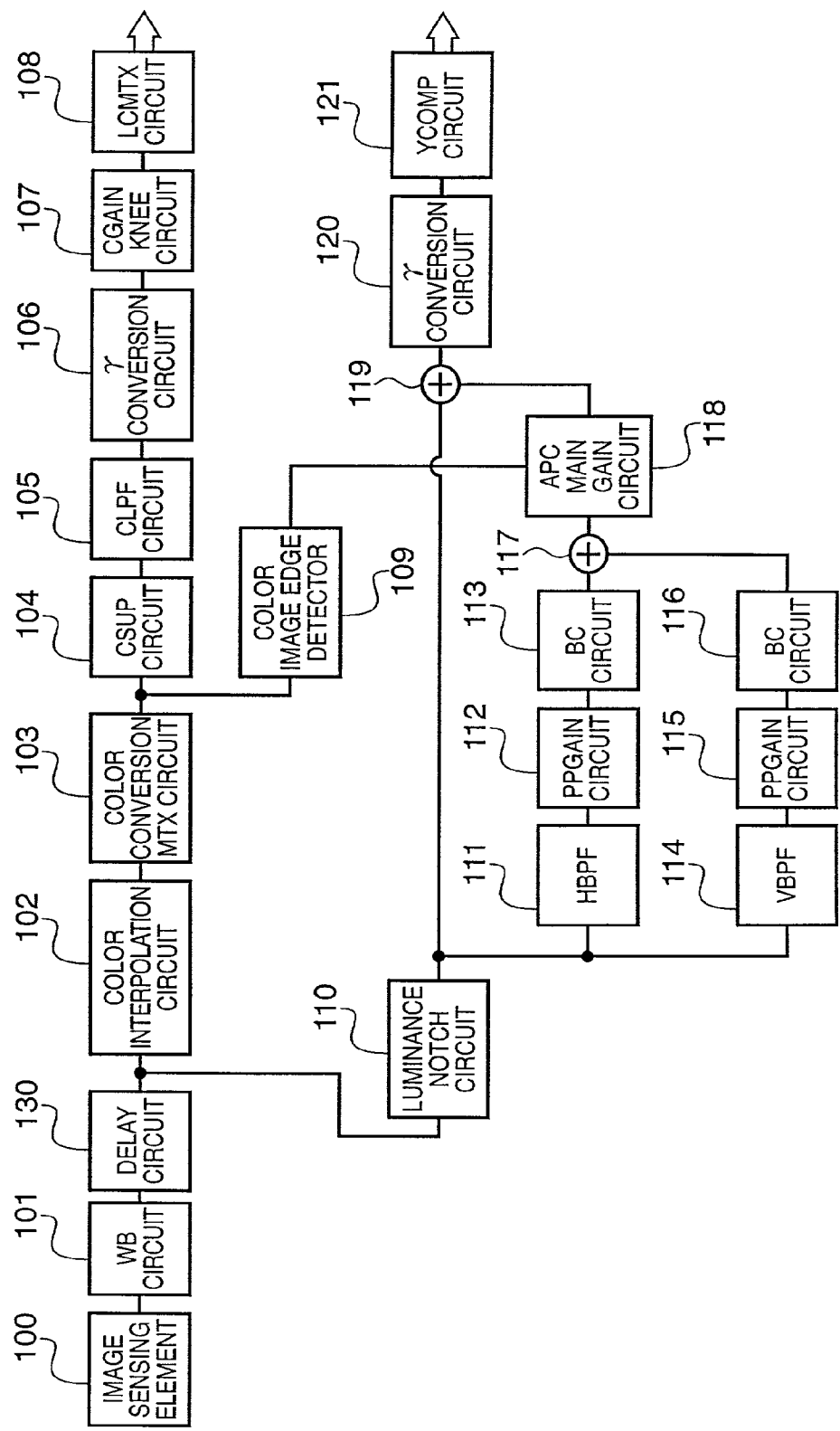
FIG. 1 is a block diagram showing a configuration of a signal processing unit for an image sensing apparatus according to a first embodiment of the present invention.
Figure 11:
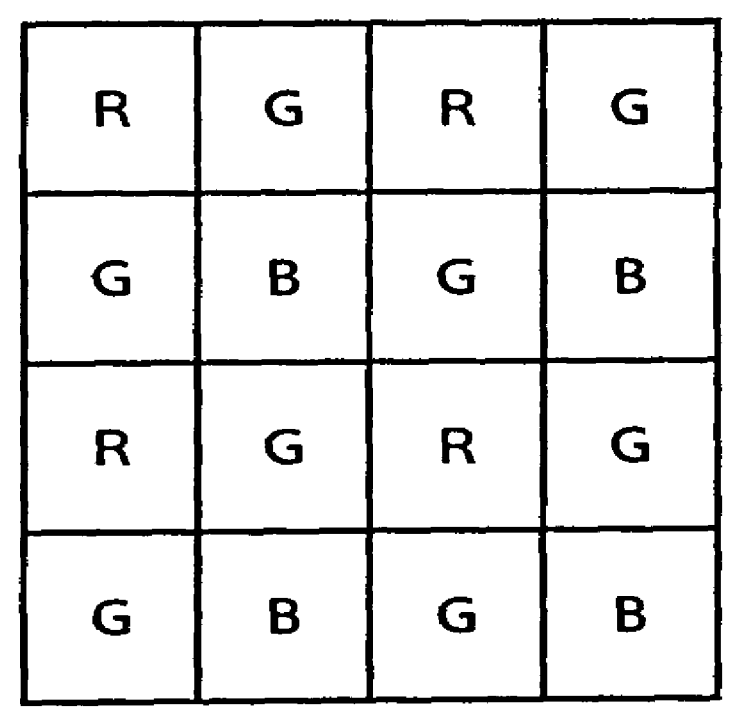

FIG. 1 is a block diagram showing an arrangement of a signal processing unit for a single CCD type image sensing apparatus, such as a digital camera, according to a first embodiment of the present invention. A signal from an image sensing element 100 is adjusted in WB by a white balance (WB) circuit 101, delayed by a delay circuit 130. The image sensing element 100 is covered with filters of a Bayer layout as shown in FIG. 11. However, the advantage of the present invention can be achieved when filters of plural colors arranged in a predetermined check pattern are used.

Thereafter, a luminance signal is sent to a luminance notch circuit 110. The luminance notch circuit 110 reduces the gain of color signal components near the Nyquist frequency in the vertical direction by using a vertical low-pass filter (VLPF), and also reduces the gain in the horizontal direction by using a horizontal low-pass filter (HLPF). These filters are called luminance notch filters. Further, the luminance notch circuit 110 applies edge enhancement processing to the luminance signal using an aperture circuit. Thereafter, a horizontal bandpass filter (HBPF) circuit 111 and vertical bandpass filter (VBPF) circuit 114 shift up frequency components slightly lower than the Nyquist frequency decreased by the notch filters.

Aperture peak (PP) gain circuits 112 and 115 adjust the amplitude in both the horizontal and vertical directions, and base clip (BC) circuits 113 and 116 clip small-amplitude components and remove noise. An adder 117 adds the horizontal and vertical components, then the resultant signal is inputted to an aperture control (APC) main gain circuit 118.

Further, a color interpolation circuit 102 interpolates chroma signals (e.g., R, G, B signals). A color conversion matrix (MTX) circuit 103 performs color correction and converts the chroma signals to luminance (Y) signals and color difference (Cr, Cb) signals. The luminance and color difference signals thus generated are sent to the color image edge detector 109.

The color image edge detector 109 detects color image edges of different hues. An example of color image edge detection method performed by the color image edge detection circuit 109 will be explained with reference to a flowchart in FIG. 2 and FIGS. 3A to 3C.

First in step S1, the hue angle of each pixel is attained. Let the hue angle to be attained be Hue, a red signal value be R, and a blue signal value be B, and a luminance value be Y, then the hue angle is obtained by the following equation.

$$\text{Hue} = (R-Y)/(B-Y)$$

FIG. 3A shows an example of hue angles attained by using the above equation at a color image edge between blue in the left half and red in the right half.

Then, differences between hue angles of adjoining pixels in the horizontal and vertical directions (may be in the oblique direction) are calculated in step S2. When the pixels near the color image edge have hue angles as shown in FIG.

3A, the differences as shown in FIG. 3B are obtained by subtracting the hue angle of a given pixel from a pixel on the left of the given pixel.

In step S3, the difference between hue angles calculated in step S2 are diffused in the opposite directions for a predetermined number of pixels. For instance, when diffusing the difference horizontally, the difference is diffused in the right and left directions. Similarly, when diffusing the difference vertically, the difference is diffused upward and downward. FIG. 3C shows a result of diffusion when differences are calculated in the horizontal direction as shown in FIG. 3B and diffused by one pixel in the right and left directions. Upon performing the diffusion, if a pixel to which a difference is to be diffused already has a value, then the value whose absolute value is larger than the other is kept. The diffusion is performed because luminance jaggedness often occurs in one or two pixels of a color image edge.

Finally, in step S4, the differences of hue angles in the horizontal and vertical directions (if differences are calculated also in the vertical direction, then those differences are also included) are synthesized (added) for each pixel. The synthesized value is called a "hue angle difference detected value".

The hue angle difference detected value is inputted from the color image edge detector 109 to the APC main gain circuit 118, and main gain of the APC main gain circuit 118 is controlled in accordance with the hue angle difference detected value. More specifically, since the hue angle difference detected value becomes large at an edge portion, the main gain is set lower as the output from the color image edge detector 109 is larger. Thereby preventing jaggedness of a color image edge between different hues from being enhanced in an aperture correction.

An adder 119 adds the output signal from the APC main gain circuit 118 and a baseband signal of a luminance signal from the luminance notch circuit 110, and sends the resultant signal to a γ conversion circuit 120. A luminance correction (YCOMP) circuit 121 corrects the luminance of the γ-converted signal.

Meanwhile, the luminance signal and color difference signals are sent from the color conversion MTX circuit 103 to the color image edge detector 109 as well as to a chroma suppress (CSUP) circuit 104, which suppresses the color-difference gain in low and high luminance regions, and a chroma low-pass filter (CLPF) circuit 105 limits the band of the chroma signals. A γ conversion circuit 106 converts the band-limited chroma signal into R, G, and B signals and at the same time γ-converts the R, G, and B signals. The γ-converted R, G, and B signals are converted into luminance signal Y and color difference signals Cr, and Cb again. A chroma gain knee circuit 107 adjusts the chroma gain of the luminance and color difference signals, and a linear clip matrix (LCMTX) circuit 108 finely adjusts the hue as well as corrects shift in hue due to variation in quality of image sensing elements.

According to the first embodiment as described above, a color image edge, between colors having different hues, which causes jaggedness in an image is detected and an aperture gain for a luminance signal is controlled, thereby greatly reducing a change of jaggedness at a color image edge being enhanced in aperture enhancement processing. As a result, a high quality luminance signal is generated.

Second Embodiment

Next, the second embodiment of the present invention will be explained. The purpose of the second embodiment is the same as that of the first embodiment, which is to reduce jaggedness at a color image edge.

The second embodiment introduces a configuration of adaptively switching between a low frequency component of a luminance signal Yg obtained by the out of green method (a method of generating a luminance signal only from green signals) often used for generating a luminance signal for video signals and a low frequency component of a luminance signal Yh obtained by the notch method. In this configuration, when the hue angle difference detected value obtained in the color image edge detector 109 as described in the first embodiment is smaller than a predetermined value, the Yh signal obtained by the notch method is used, whereas, when the hue angle difference detected value is large, then the Yg' signal is used in place of Yh signal in an area where an opposite hue edge is detected.

First, the out of green method is explained. In the out of green method, a green (G) signal is generated by adaptive interpolation, and the G signal is used as a luminance signal. Since the luminance signal is generated from signals of a single color in the out of green method and thus the spatial frequency of the single color for sampling image signals is lower than the notch method as seen in FIG. 11, the resolution of the luminance signal is lower than that of the luminance signal generated by the notch method using all of the R, G and B signals; however, the out of green method does not suffer hue angle difference and jaggedness does not occur. In the out of green method, correlation between adjoining pixels of a pixel to be interpolated in the horizontal and vertical directions is determined, and if the correlation is higher in the vertical direction than in the horizontal direction, then the pixel is interpolated using values of upper and lower pixels, whereas, if the correlation is higher in the horizontal direction than in the vertical direction, then the pixel is interpolated using values of the right and left pixels. In this manner, a proper luminance signal is generated.

Figure 4:
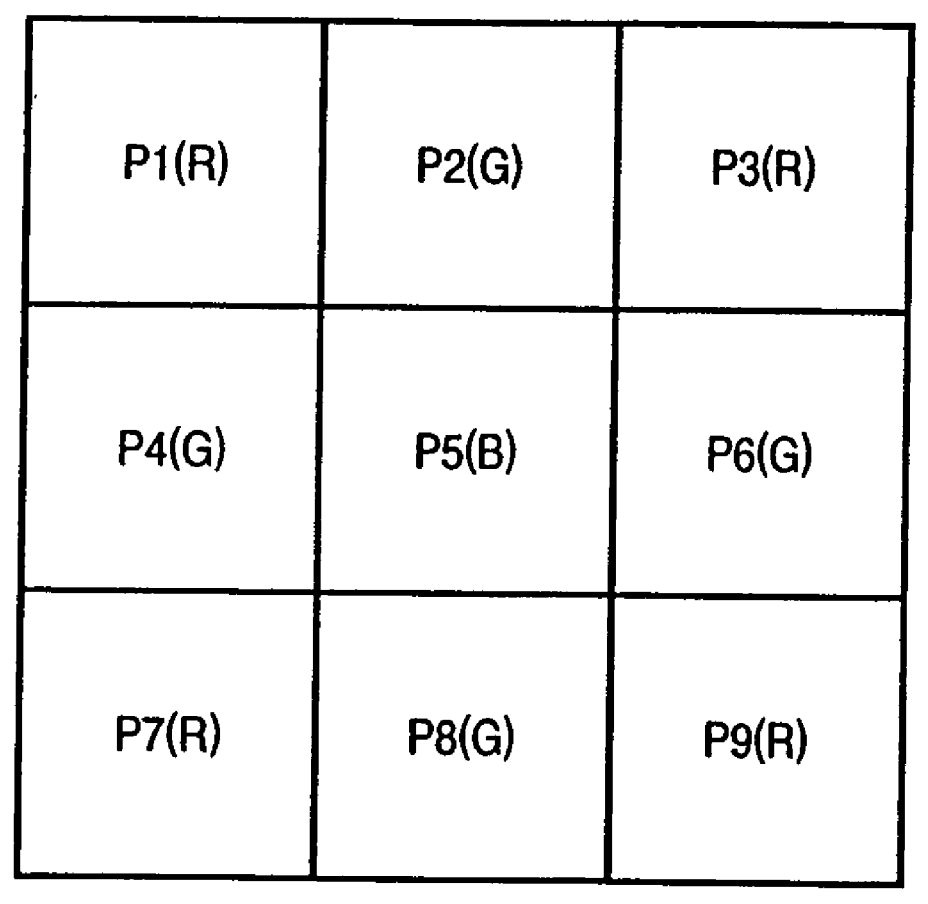

The out of green method will be described in more detail below. To interpolate a green signal (P5(G)) at a blue pixel P5(B) in FIG. 4 (P1 to P9 represent pixel positions, and each character in parentheses represents a chroma signal obtained from the pixel and corresponds to the filter color) when the filter layout is as shown in FIG. 11, interpolation procedure is as follows.

1. The absolute values (HDiff and VDiff) of the differences between upper and lower pixels of the pixel to be interpolated and between right and left pixels of the pixel to be interpolated are calculated by equation (1):

$$HDiff=|P4(G)-P6(G)|,$$

$$VDiff=|P2(G)-P8(G)| \tag{1}$$

2. The interpolation method is changed based on the calculated absolute values.

If VDiff<HDiff, the green signal P5(G) is interpolated using signals of adjoining pixels in the vertical direction by equation (2):

$$P5(G)=(P2(G)+P8(G))/2 \tag{2}$$

If VDiff>HDiff, the green signal P5(G) is interpolated using signals of adjoining pixels in the horizontal direction by equation (3):

$$P5(G)=(P4(G)+P6(G))/2 \tag{3}$$

Green signals adaptively interpolated as above are used as luminance signals. It should be noted that the luminance notch circuit 110 interpolates for R, G and B signals in the similar manner as described above, and generates luminance signals using all of the R, G and B signals.

Since luminance signals are generated by adaptive interpolation using only G signals in the out of green method, by using the luminance signals generated by the out of green method in a case where an opposite hue edge are detected, jaggedness does not occur. Further, in a normal area, i.e., an area other than the opposite hue edge, Yh signals obtained by the notch method, thereby improving resolution of an image.

Next, processing of luminance signals according to the second embodiment will be described with reference to FIGS. 5 and 6.

Figure 5:
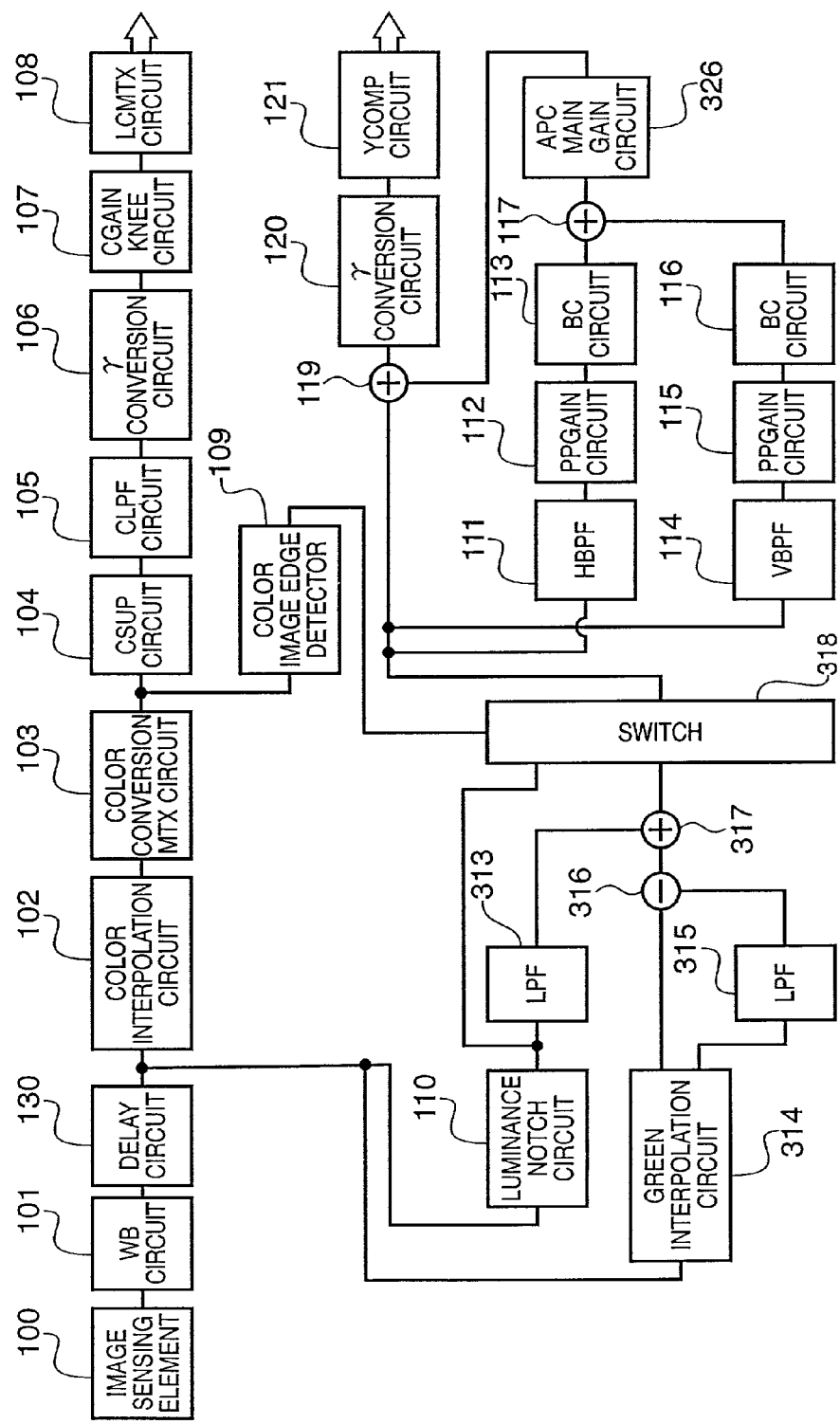
FIG. 5 is a block diagram showing a configuration of a signal processing unit for an image sensing apparatus according to a second embodiment of the present invention.
Figure 6:
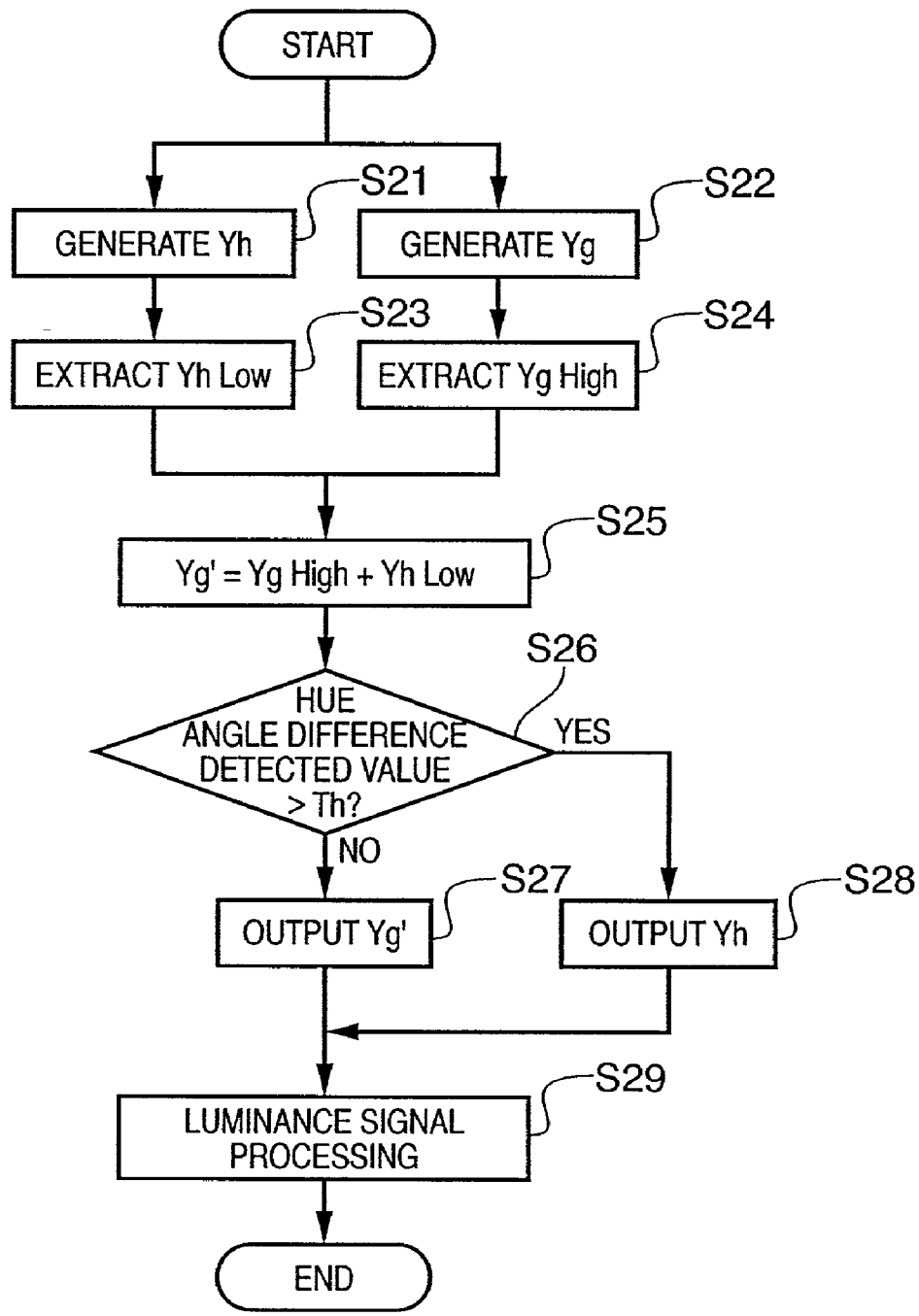
FIG. 6 is a flowchart for explaining a luminance signal processing according to the second embodiment.

FIG. 5 is a block diagram illustrating a configuration of a signal processing unit for an image sensing apparatus such as a digital camera according to the second embodiment of the present invention, and FIG. 6 is a flowchart showing a processing sequence of luminance signals according to the second embodiment. In FIG. 5, the units and elements as those in FIG. 1 are referred to by the same reference numerals and explanation of them are omitted.

Referring to FIG. 6, Yh is generated by the luminance notch circuit 110 in step S21, and a G signal generated by the out of green method as explained above in a Green interpolation circuit 314 is outputted as the luminance signal Yg in step S22.

In step S24, the Yg signal is passed through an LPF circuit 315 to extract low frequency component of the luminance signal, YgLow. The low frequency component YgLow is subtracted from the Yg signal by a subtractor 316, thereby the high frequency component of the luminance signal, YgHigh, is obtained. Further, for equating the ratio between color components of the luminance signal obtained by the out of green method and that of the luminance signal obtained by the notch method, a low frequency component of the luminance signal obtained by the notch method is used instead of YgLow. For this purpose, the luminance signal Yh from the luminance notch circuit 110 is inputted to the switch 318 as well as to an LPF circuit 313, and the low frequency component of the luminance signal, YhLow, is outputted from the LPF circuit 313 in step S23. This YhLow signal and the YgHigh signal outputted from the subtractor 316 are added by an adder 317 (step S25), thereby a luminance signal Yg' is generated. The Yg' signal is inputted to the switch 318.

Thus, the Yh signal and Yg' signal are inputted to the switch 318, and one of these signals is outputted in accordance with the hue angle difference detected value outputted from the color image edge detector 109 (steps S26 to S28). Calculation method of hue angle difference detected value performed in the color image edge detector 109 is the same as that explained in the first embodiment, therefore the explanation of the method is omitted here. Then, when the hue angle difference detected value is less than or equal to a predetermined threshold value Th (NO in step S26), then the luminance signal Yh is outputted from the luminance notch circuit 110 (step S28). Whereas, when the hue angle difference detected value is greater than the predetermined threshold value Th (YES in step S26), since the pixel is determined that it is on an opposite hue edge, the luminance signal Yg' is outputted in place of the luminance signal Yh generated by the luminance notch circuit 110 (step S27)

In step S29, the luminance signal Yh or Yg' outputted from the switch 318 is sent to a horizontal bandpass filter (HBPF) circuit 111 and vertical bandpass filter (VBPF) circuit 114 and shifted up frequency components slightly lower than the Nyquist frequency decreased by the notch filters.

Aperture peak (PP) gain circuits 112 and 115 adjust the amplitude in both the horizontal and vertical directions, and base clip (BC) circuits 113 and 116 clip small-amplitude components and remove noise. An adder 117 adds the horizontal and vertical components, then the resultant signal is inputted to an aperture control (APC) main gain circuit 326 and amplified by a main gain.

An adder 119 adds the output signal from the APC main gain circuit 326 and a baseband signal, and sends the resultant signal to a γ conversion circuit 120. A luminance correction (YCOMP) circuit 121 corrects the luminance of the γ-converted signal.

Processes performed by CSUP circuit 104 and its subsequent circuits are the same as those described in the first embodiment with reference to FIG. 1, therefore, explanation of them is omitted.

It should be noted that, when the luminance signal Yh generated by the luminance notch circuit 110 is selected by the switch 318, the gain of the APC main gain circuit 326 may be changed in accordance with the value of the hue angle difference detected value from the color image edge detector 109.

According to the second embodiment as described above, a luminance signal generated by the notch method is used in a normal area, and a luminance signal generated by the out of green method is used at an opposite hue edge. Thus, jaggedness at the opposite hue edge can be reduced by utilizing the luminance signal generated by the out of green method. In addition, resolution of color image edges other than green in a normal area is not lost by using the luminance signal generated by the notch method, where the drop of the resolution is a problem of the out of green method.

Further, the low frequency component of the luminance signal obtained by the out of green method is replaced by that of the luminance signal obtained by the notch method, therefore, ratios of the color components are kept the same between the luminance signals generated by the notch method and the out of green method.

<Modification>

Figure 7:
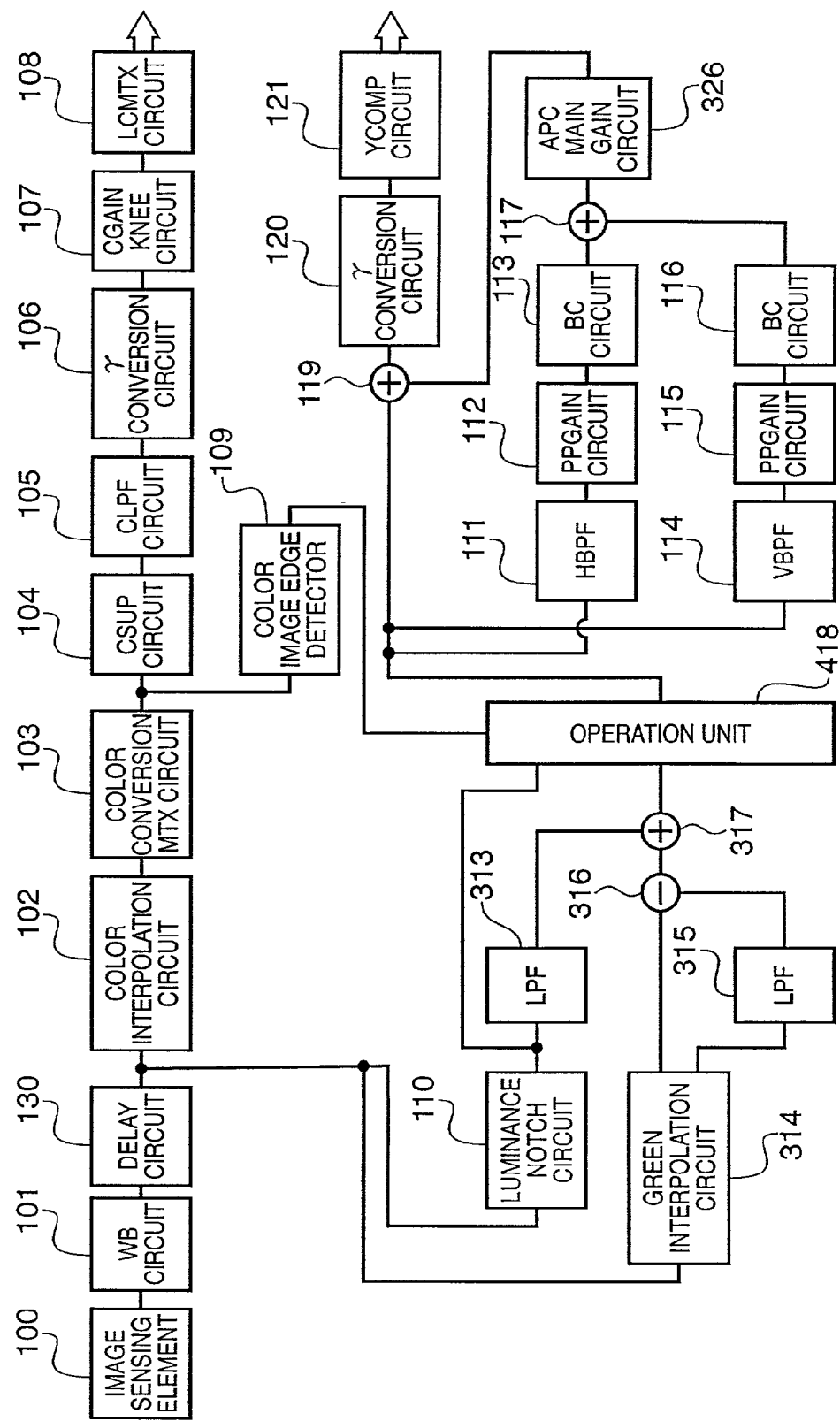
FIG. 7 is a block diagram showing a configuration of a signal processing unit for an image sensing apparatus according to a modification of the second embodiment of the present invention.
Figure 9:
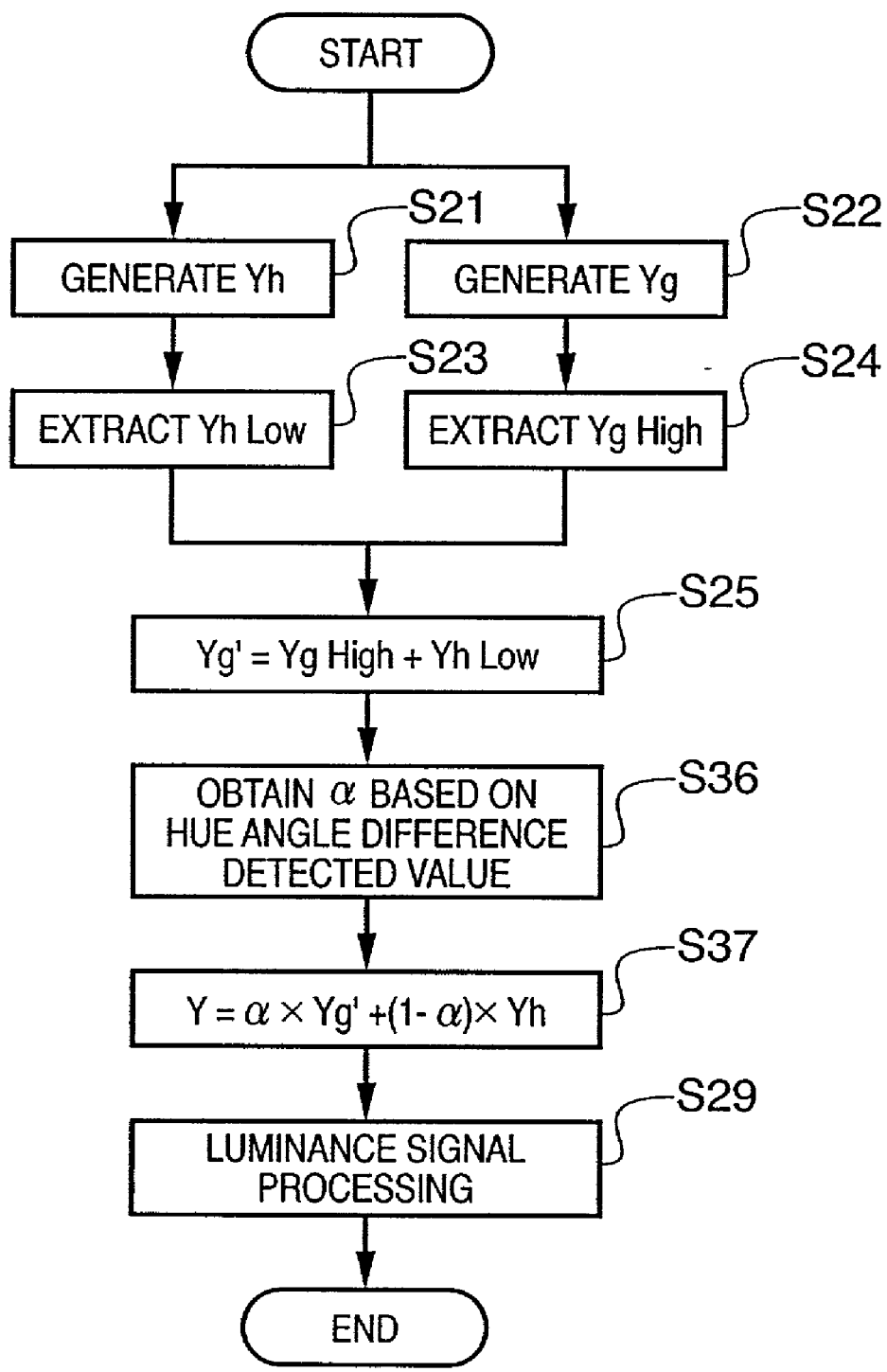
FIG. 9 is a flowchart for explaining luminance signal processing according to the modification of the second embodiment of the present invention.
Figure 10:
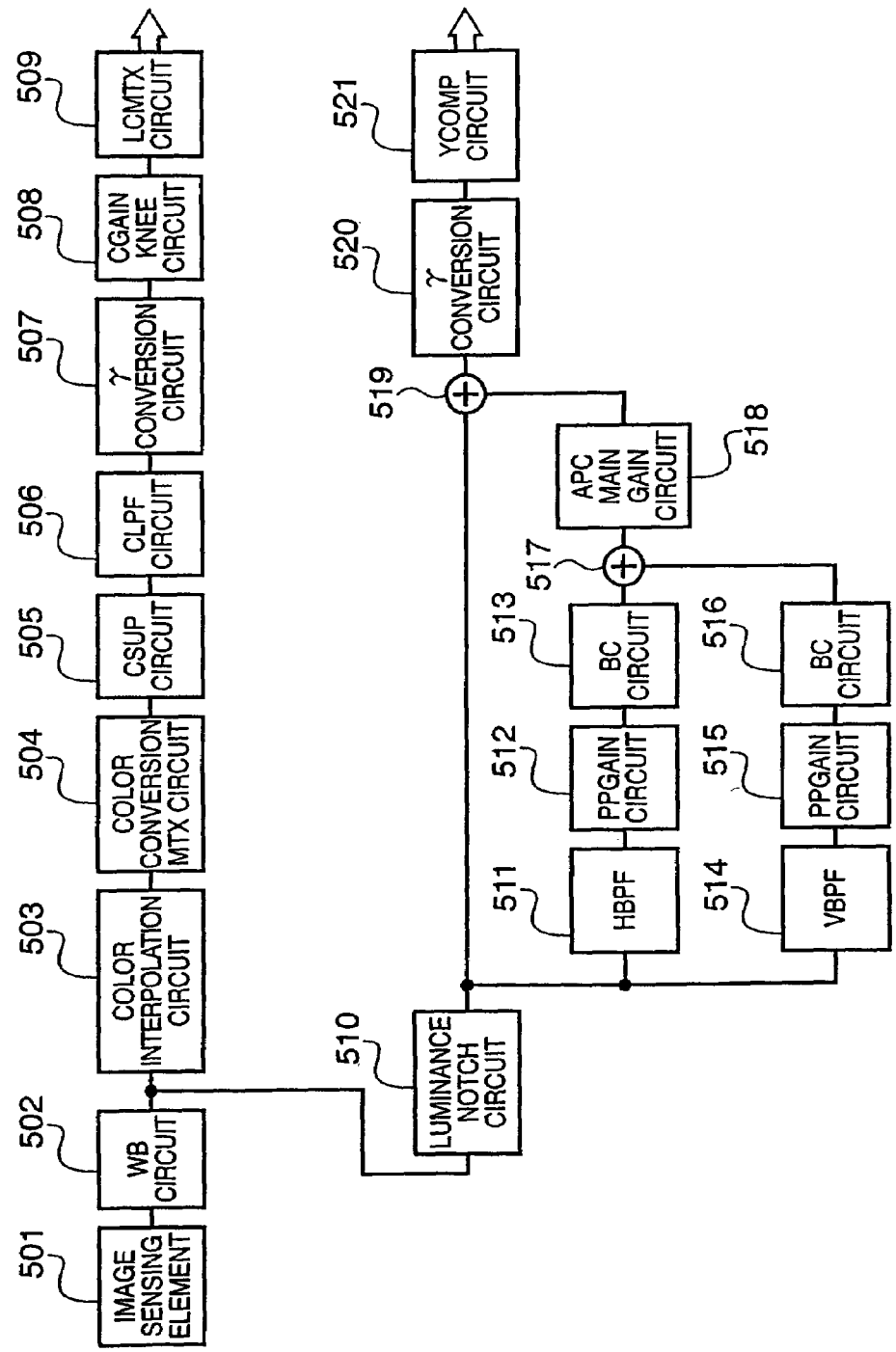
FIG. 10 is a block diagram showing a configuration of a signal processing unit for a conventional image sensing apparatus.
Figure 12A:
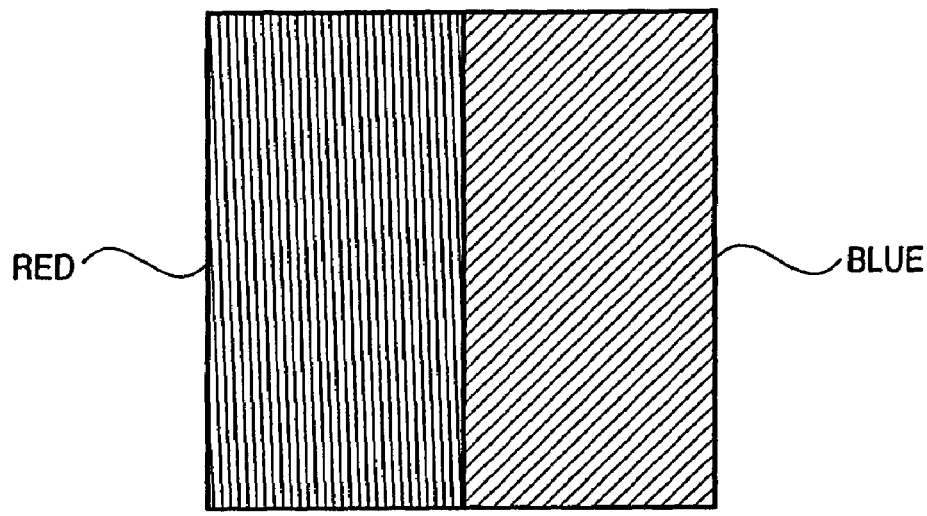
FIGS. 12A and 12B are views for explaining generation of jaggedness.
Figure 12B:
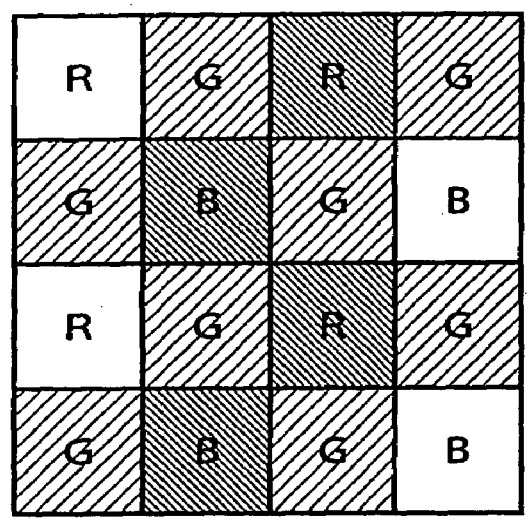

In the above second embodiment, when the hue angle difference detected value outputted from the color image edge detector 109 is greater than a predetermined threshold value and a pixel is determined as at an opposite hue edge, the luminance signal Yh output from the luminance notch circuit 110 is replaced by the luminance signal Yg'. However, in order to avoid an effect of sudden switch between the luminance signals Yh and Yg' on a resultant image, a mixture of the luminance signals Yh and Yg' may be used by performing a linear operation. A configuration for realizing the above operation is shown in FIG. 7, and its processing sequence is shown in FIG. 9. FIG. 7 differs from FIG. 5 in that an operation unit 418 is inserted in place of the switch 318. Further in FIG. 9, the same processes as those in FIG. 7 is referred to by the same step numbers, and explanation of them are omitted.

Figure 8:
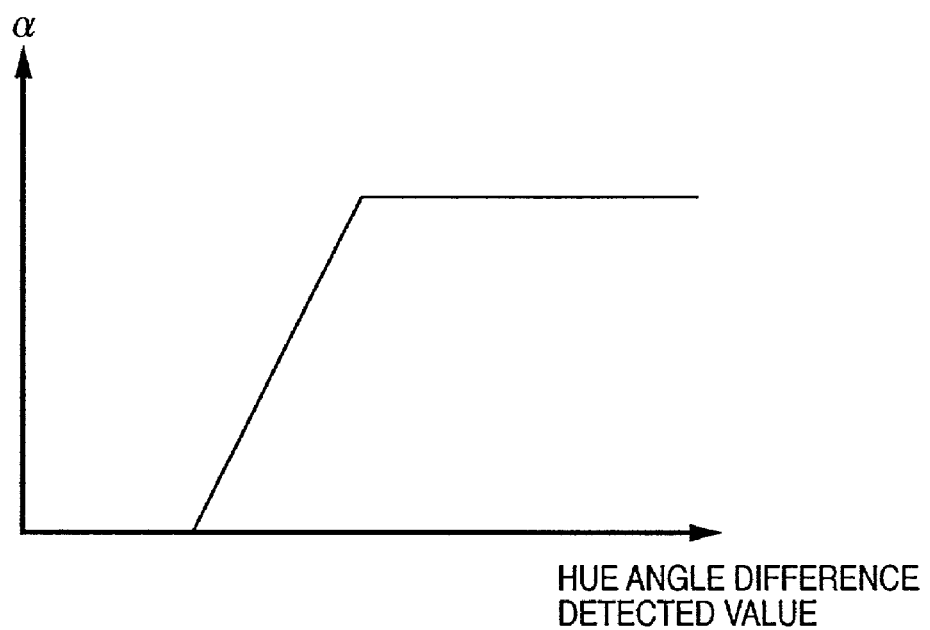
FIG. 8 is a graph showing the relationship between detected values of hue angle difference and a coefficient α according to the modification of the second embodiment of the present invention.

Similarly to the first and second embodiments, the color image edge detector 109 outputs a hue angle difference detected value of a given pixel. Accordingly, a coefficient α is obtained based on the absolute value of the hue angle difference detected value using the graph shown in FIG. 8, a look up table holding the similar data, a function, and so on (step S36). Then a luminance signal is obtained using the coefficient α in accordance with the following equation, and the result is outputted (step S37).

$Y = \alpha \times Yg' + (1-\alpha) \times Yh (0 \leq \alpha \leq 1)$

According to the modification, in addition to the same advantages as the second embodiment, sudden change in luminance due to switching between two types of luminance signals is avoided.

According to the present invention as described above, it is possible to greatly reduce a possibility of jaggedness occurred at color image edges being enhanced by edge enhancement, thereby it is possible to generating a luminance signal of high quality.

<Other Embodiment>

The present invention can be applied to a system constituted by a plurality of devices (e.g., host computer, interface, reader, camera head) or to an apparatus comprising a single device (e.g., digital camera, video camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. A signal processing apparatus for processing an image signal comprising:
a hue difference detector for detecting a hue difference between adjoining pixels; and
luminance edge enhancement means for enhancing an edge pixel in an image by amplifying an edge luminance signal by a gain determined on the basis of the hue difference detected by said hue difference detector, wherein said hue difference detector includes: hue angle acquisition means for acquiring a hue angle of each pixel; a subtractor for obtaining a hue angle difference between adjoining pixels; and diffusion means for diffusing the hue angle difference.

2. The signal processing apparatus according to claim 1, wherein said subtractor obtains hue angle differences between a pixel of interest and its adjoining pixels in the horizontal and vertical directions, and the hue angle difference of the pixel of interest is obtained by adding the hue angle differences in the horizontal and vertical directions.

3. The signal processing apparatus according to claim 1, wherein said subtractor obtains a hue angle difference between a pixel of interest and its adjoining pixel in the oblique direction.

4. The signal processing apparatus according to claim 1, wherein said diffusion means compares an absolute value of the hue angle difference between pixels of interest to an absolute value of the hue angle difference between neighbor pixels, and performs the diffusion when the absolute value of the hue angle difference between the pixels of interest is greater than the absolute value of the hue angle difference between the neighbor pixels.

5. The signal processing apparatus according to claim 1, wherein said hue angle difference acquisition means calculates the hue angle using a color difference signal.

6. A signal processing method for processing an image signal comprising:
a hue difference detection step of detecting a hue difference between adjoining pixels; and
a luminance edge enhancement step of enhancing an edge pixel in an image by amplifying an edge luminance signal by a gain determined on the basis of the hue difference detected at said hue difference detection step, wherein said hue difference detection step includes: a hue angle acquisition step of acquiring a hue angle of each pixel; a subtracting step of obtaining a hue angle difference between adjoining pixels; and a diffusion step of diffusing the hue angle difference.

7. The signal processing method according to claim 6, wherein said subtraction step comprises: a step of obtaining a hue angle difference between a pixel of interest and its adjoining pixel in the horizontal direction; a step of obtaining a hue angle difference between the pixel of interest and its adjoining pixel in the vertical direction; and a step of adding the hue angle differences in the horizontal and vertical directions.

8. The signal processing method according to claim 6, wherein, in said subtraction step, a hue angle difference between a pixel of interest and its adjoining pixel in the oblique direction is obtained.

9. The signal processing method according to claim 6, wherein, in said diffusion step, an absolute value of the hue angle difference between pixels of interest is compared to an absolute value of the hue angle difference of neighbor pixels, and when the absolute value of the hue angle difference of the pixels of interest is greater than the absolute value of the hue angle difference of the neighbor pixels, the diffusion is performed.

10. The signal processing method according to claim 6, wherein, in said hue angle difference acquisition step, the hue angle is calculated using a color difference signal.

11. An image sensing apparatus comprising a signal processing apparatus of claim 1.

12. A computer program product for reducing jaggedness on color image edges comprising a computer readable medium having computer readable program code means embodied in said medium for a signal processing method for processing an image signal, said computer program product including:
first computer readable program code means for detecting a hue difference between adjoining pixels; and second computer readable program code means for enhancing an edge pixel in an image by controlling an edge luminance signal by a gain detennined on the basis of the detected hue difference, wherein said first computer readable program code means includes:

third computer readable program code means for acquiring a hue angle of each pixel;

fourth computer readable program code means for obtaining a hue angle difference between adjoining pixels; and fifth computer readable program code means for diffusing the hue angle difference, whereby the jaggedness on color image edges is reduced.

* * * * *